United States Patent
Fescioglu-Unver

(10) Patent No.: US 12,462,206 B2
(45) Date of Patent: Nov. 4, 2025

(54) DETERMINE PRIORITY OF CHANGING OF ELECTRIC VEHICLES

(71) Applicant: TOBB EKONOMI VE TEKNOLOJI UNIVERSITESI, Ankara (AR)

(72) Inventor: Nilgun Fescioglu-Unver, Ankara (TR)

( * ) Notice: Subject to any disclaimer, the term of this patent is extended or adjusted under 35 U.S.C. 154(b) by 22 days.

(21) Appl. No.: 18/718,816

(22) PCT Filed: Dec. 14, 2022

(86) PCT No.: PCT/TR2022/051506
§ 371 (c)(1),
(2) Date: Jun. 12, 2024

(87) PCT Pub. No.: WO2023/113760
PCT Pub. Date: Jun. 22, 2023

(65) Prior Publication Data
US 2025/0053906 A1    Feb. 13, 2025

(30) Foreign Application Priority Data
Dec. 15, 2021  (TR) ............................. 2021/019992

(51) Int. Cl.
| G06Q 10/06 | (2023.01) |
| B60L 53/30 | (2019.01) |
| B60L 53/66 | (2019.01) |
| B60L 53/68 | (2019.01) |
| G06Q 10/0631 | (2023.01) |

(52) U.S. Cl.
CPC ...... *G06Q 10/06316* (2013.01); *B60L 53/305* (2019.02); *B60L 53/66* (2019.02); *B60L 53/68* (2019.02); *B60L 2240/80* (2013.01)

(58) Field of Classification Search
None
See application file for complete search history.

(56) References Cited

U.S. PATENT DOCUMENTS

| 2017/0098941 A1 | 4/2017 | Akbulut et al. |
| 2019/0202315 A1* | 7/2019 | Wilding ................ G06Q 10/02 |
| 2020/0353833 A1 | 11/2020 | Kim et al. |
| 2021/0206286 A1* | 7/2021 | Choi ...................... B60L 53/66 |
| 2023/0004901 A1* | 1/2023 | Shaotran ................ B60L 50/60 |

FOREIGN PATENT DOCUMENTS

| CN | 112134300 B | 3/2022 |
| KR | 20110004294 A | 1/2011 |
| KR | 20150103407 A | 9/2015 |

OTHER PUBLICATIONS

International Search Report for corresponding PCT/TR2022/051506 dated Jun. 15, 2023.
Written Opinion of the International Searching Authority for corresponding PCT/TR2022/051506 dated Jun. 15, 2023.

* cited by examiner

*Primary Examiner* — Alan Torrico-Lopez
(74) *Attorney, Agent, or Firm* — Egbert, McDaniel & Swartz, PLLC

(57) ABSTRACT

Disclosed is an electric vehicle charging station enabling users to receive fast service with high or low priority, and keeping the ratio of average waiting times of low priority and high priority vehicles in the station at the same time within the target waiting time declared by the station, using a simulation based estimator based on the station's current state.

10 Claims, 2 Drawing Sheets

DETERMINE PRIORITY OF CHANGING OF ELECTRIC VEHICLES

TECHNICAL FIELD

Figure 1:
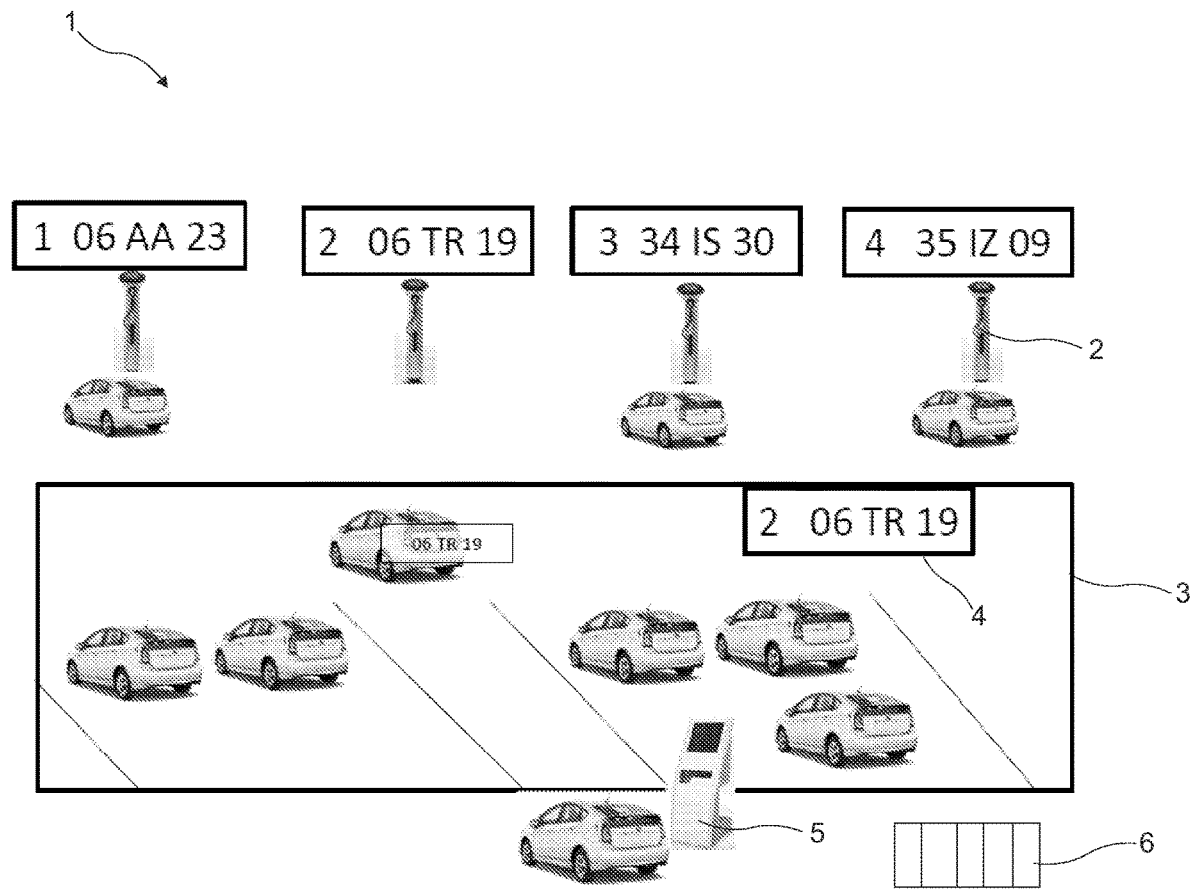

The present invention relates to an express electric vehicle charging station that provides priority service for the charging of electric vehicles according to the preferences of the vehicle owners, and that enables the vehicles to be directed to the charging units by simulating different scenarios according to the charging station's current state.

PRIOR ART

Electric vehicles are encouraged by governments both for reducing environmental pollution and for economic reasons, and are developing rapidly. Charging of a vehicle at home environment with direct connection to the mains takes up to all night. The demand for commercial fast charging stations open to the public is also increasing due to the insufficient availability of electric vehicle batteries for long journeys and the limited availability of vehicle charging in building parking lots of city dwellers.

Electric vehicle charging stations are devices that use electrical energy to charge electric vehicles. These stations are used to charge electric vehicles by providing special connectors for vehicles that conform to various electric charge connector standards. With the importance of renewable energy, increasing interest in systems with low carbon emissions, and the development of battery technologies in electric vehicles, the interest and demand for electric vehicles is increasing. With the increase in the use of electric vehicles, electric vehicle charging stations have also started to become widespread. As the demand for charging stations increases, there is a greater need for equipment that supports faster charging at higher voltages and currents. Globally, the system of public charging stations for electric vehicle charging is increasing and efforts are underway to provide these infrastructures in the energy sector.

At fast charging stations, charging with level-3 equipment can be completed in less than 30 minutes, depending on the type and state of charge of the vehicle. This time is considerably longer than the filling time of gasoline vehicles. It is predicted that the insufficient number of fast charging stations and the long charging time will cause congestion and long waiting times at the stations. Long waiting times increase the time that electric vehicle owners lose in traffic. At the same time, the concern about waiting times prevents the spread of electric vehicles.

One of the technical problems with electric charging stations is the length of the charging time and the long waiting times at the charging stations. With the present patent application, vehicles waiting in electric vehicle fast charging (level-3) stations are evaluated in two classes as high and low priority, and high priority vehicles are offered to wait less than the low priority vehicles. With the application, the users can get a priority charging order when they enter the charging station and start the charging process at the charger they are directed to.

An electric charging station control system is described in the Korean patent document numbered KR20110004294, which is state of the art. In this study, the priority of the vehicles arriving at the station is determined by systems such as an identification system or ID card, and customers are directed to the appropriate lines according to the station density information. In that document, the system makes definitions. In the present application, the users select the level of service they request and the system allocates resources and guides the vehicles according to their requests. The system performs resource management and error calculations in accordance with a target waiting time ratio of low priority vehicles' average waiting time to high priority vehicles' average waiting time, and dynamically makes resource allocation and directs vehicles according to their priorities.

In the state of the art, the Chinese patent document numbered CN112134300 describes an electric vehicle charging station management that will operate optimally. In the aforementioned Chinese document, reservation is made for service purchase from the charging station. It makes appropriate calculations by using the energy to be supplied according to the workload on the system, the workload on the stations and the previous period transactions. In the said Chinese patent document, there is no explanation regarding the orientation of the vehicles and the direction of the vehicle to the charger determined by the system. In the present application, resource usage is planned by the system and vehicle guidance is provided according to the requests from the users and according to the user selection. The system simulates the waiting times of the vehicles according to different previously determined scenarios and makes delay planning and charging unit planning according to the results.

OBJECTIVES OF THE INVENTION

The objective of the present invention is to realize an electric vehicle charging station that divides the vehicles that want to be charged into two priority classes and enables high priority vehicles to receive service with less or no waiting time.

Another objective of the present invention is to realize an electric vehicle charging station that allows the charging devices in the charging station to be instantaneously and dynamically scheduled as low priority and high priority, and if preferred, the service received can be priced according to the said planning.

Another objective of the present invention is to realize an electric vehicle charging station, where the user can get fast service or normal service, which can simulate different scenarios according to the service priority that the user wants to receive, estimate the possible waiting times of the users, and choose the most appropriate charging device-service class allocation scenario according to these waiting times.

BRIEF DESCRIPTION OF THE INVENTION

With the electric vehicle charging station, which is the subject of the application, it is ensured that users can receive service according to high or low priority demand, and pay a charging fee according to the priority of the service they receive. The electric vehicle charging station as defined in the first claim and other claims dependent on this claim, realized to achieve the purpose of the present invention; comprises a charging unit, a waiting area, a guidance signboard, a kiosk, a tracking monitor and a controller. When an event occurs at the station, the controller simulates different scenarios involving different use of charging units. According to the simulated results of the scenarios in question, the waiting times of the vehicles are estimated, and the class (high priority (HP)/low priority (LP) vehicle class) to which the empty server will be assigned is selected.

DETAILED DESCRIPTION OF THE INVENTION

The electric vehicle charging station provided to achieve the purpose of the present invention is shown in the attached figures, among which:

FIG. 1. is a schematic view of the electric vehicle charging station.

Figure 2:
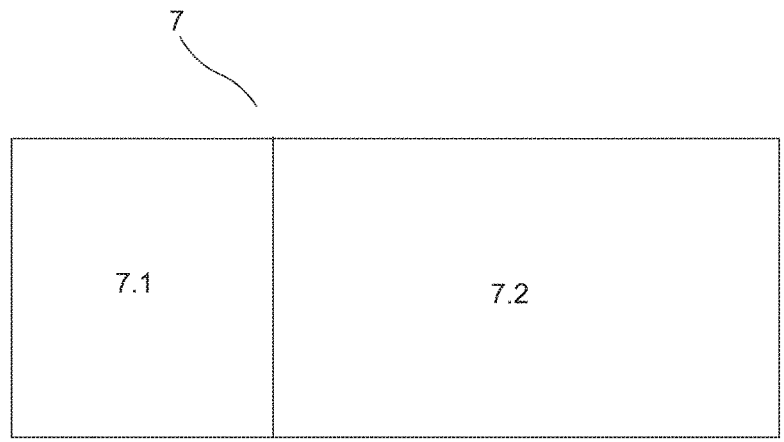

FIG. 2. is a schematic view of the controller.

Figure 3:
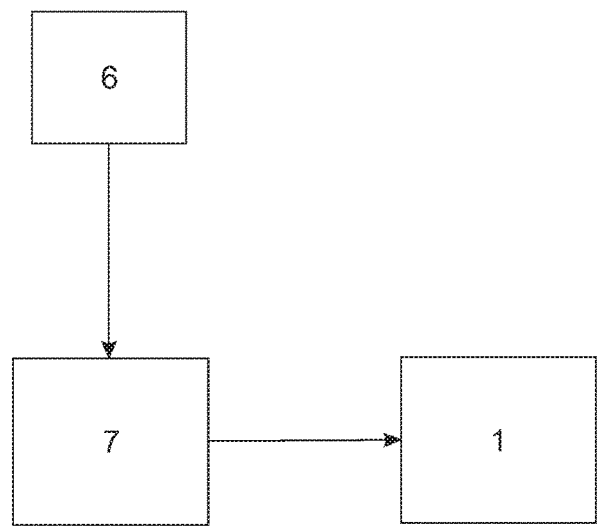

FIG. 3. is a schematic view of the electric vehicle charging station control model.

Figure 4:
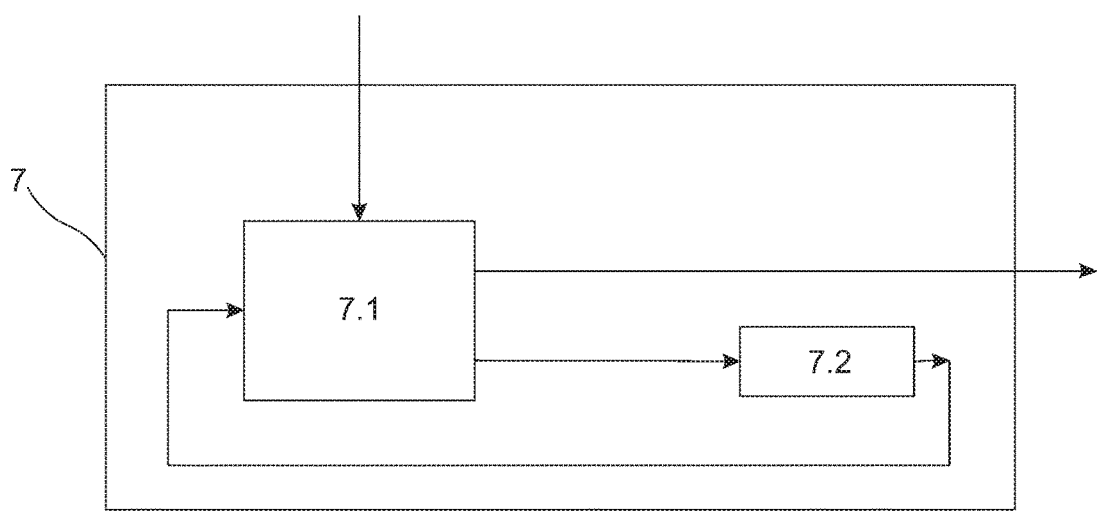

FIG. 4. is a schematic view of the controller.

The components given in the figures are enumerated individually, and the meanings of these numbers are given below.

1. Electric vehicle charging station
2. Charging unit
3. Waiting area
4. Guidance signboard
5. Kiosk
6. Tracking monitor
7. Controller
   7.1. Decision maker
   7.2. System module This invention relates to an express electric vehicle charging station (1), which enables electric vehicles to receive priority service for charging according to the preferences of vehicle owners, and enables vehicles in the relevant priority class to be directed to the charging unit (2) by simulating different scenarios according to the occupancy rate and state of the charging station (1).

This invention enables users to receive high or low priority service at different speeds, by using a simulation-based estimator, to keep the ratio of average waiting times of low priority and high priority vehicles in the same queue at the station at the target waiting time rate announced by the station. The electric vehicle charging station (1) comprises:

- at least one charging unit (2) enabling the charging of electric vehicles and keeping track of the charged vehicle information, the charging time, and the charging time recording,
- a waiting area at the station (3) having sections where vehicles can wait and having a guidance signboard (4),
- at least one kiosk (5), located at the station entrance, with a screen, wireless data communication unit and processor on which the user can interact with his smart device, and adapted to receive the user's high priority or low priority service request by recognizing the user,
- a tracking monitor (6) adapted to communicate with the charging unit (2), guidance signboard (4), and kiosk (5) in a wired or wireless fashion, to track the events and time, track the entry, exit, service start and end times of all vehicles according to the data received from the charging unit (2), to track the event related to the vehicle when a vehicle enters or exits the station, and transmit thereof to the controller (7),
- a controller (7) comprising a decision maker (7.1) and a system module (7.2), and adapted to take action with the event reported by the tracking monitor (6), to decide whether the charging unit (2) which becomes idle when the vehicle leaves the station would be assigned to a high priority or low priority vehicle class, and to decide where to direct the incoming vehicle when a new vehicle arrives at the station,
- a decision maker (7.1) adapted to take action first when the controller (7) works, to act differently depending on the vehicle arrival or departure event that caused the controller (7) to operate,
- in case the event is a vehicle arrival and there is an idle charging unit (2) at the station, to direct the vehicle to the charging unit, and if there is no idle charging unit (2), to direct the vehicle to the waiting area (3), in case the event that occurs is a vehicle leaving the station, and if there is only one class vehicle in the waiting area (3), to direct the first vehicle of that class to the idle charging unit (2), and in case there are vehicles of both classes in the waiting area, to determine which class the idle charging unit (2) will be assigned to,
- a system module (7.2) adapted to estimate the effect of the decisions made by the decision maker (7.1) on the average waiting times of the high priority and low priority vehicles in the station, run by the decision maker (7.1) for different scenarios, and to enable the decision maker (7.1) to make their decisions based on the said prediction results.

The electric vehicle charging station (1), which is the subject of the invention, can provide high or low priority electric vehicle charging service according to the demands of the users. The users can decide whether to receive high priority or low priority service before or when they arrive at the station. Priority service is provided at the electric vehicle charging station (1), allowing high priority users to receive service with shorter or no waiting time. In the electric vehicle charging station (1), operation is preferably modeled according to at least two priorities: high priority and low priority. Users who want to charge their vehicles with high priority can have their vehicles charged without waiting or waiting less than low priority ones. The electric vehicle charging station (1) gives a waiting time rate to its users. When users come to the electric vehicle charging station (1), they would know that they can charge their vehicles faster by paying a high priority service fee and by waiting less than the other waiting vehicles.

At the electric vehicle charging station (1), a waiting area (3) for vehicles that are not being charged, a guidance signboard (4) that provides information to and ensures guidance for the vehicles in the waiting area (3), and a kiosk (5) at the station entrance and a tracking monitor (6) that monitors the station and provides management are found.

There is a kiosk (5) at the entrance of the electric vehicle charging station (1). The kiosk (5) comprises hardware parts such as at least one display, a wireless transmitter, a receiver, a Wi-Fi circuit, a speaker, a timer, and a counter. When the users arrive at the electric charging station (1), they give their information to the kiosk (5) or the kiosk (5) recognizes the vehicle. The user can transmit high priority or low priority request and vehicle information to the kiosk (5) via an application on the smart device (such as a phone, tablet). In an embodiment of the invention, with the smart vehicle identification system on the kiosk (5) or the vehicle identification system integrated with the kiosk (5), a user can automatically be recognized from the user plate. In another embodiment of the invention, the kiosk (5) only records the incoming users and transmits the incoming user information to the tracking monitor, keeping no records in its memory.

When the kiosk (5) enters the electric vehicle charging station (1), it records what time the vehicle entered the station. The kiosk (5) also informs the user about which charging unit (2) the vehicle will go to according to the service type (high priority/low priority) and service duration. When the vehicle enters the electric vehicle charging station (1), if all charging units (2) are full, the vehicle is directed to the waiting area (3).

The waiting area (3) is an area where vehicles park and wait for their turn to be charged. In the waiting area (3) there are divided and marked parking areas where each vehicle can park. While vehicles are waiting in line for charging, they preferably wait for their turn in the said waiting area (3).

There is a guidance signboard (4) in the waiting area (3) of the electric vehicle charging station (1). The guidance signboard (4) preferably comprises hardware such as display, processor, memory card, cable/wireless transceiver, and speaker. There is preferably a screen on the guidance signboard (4) and information is provided on the screen. Information on which vehicle will go to which charging unit (2), and which charger (2) is planned for which vehicle can be followed over the guidance signboard (4). The guidance signboard (4) can also make a vocal announcement. The notifications made on the guidance signboard (4) can also be made audibly.

In the electric vehicle charging station (1), which is the subject of the invention, the charging unit (2), the guidance signboard (4) and the kiosk (5) have a receiver and transmitter that can communicate with the tracking monitor (6) both in wired and wireless fashion, and can communicate with each other. In an embodiment of the invention, all modules, such as the charging unit (2), the guidance signboard (4), the kiosk (5) and the tracking monitor (6) can communicate with each other, and transmit and receive data to/from each other.

In the electric vehicle charging station (1), which is the subject of the invention, the tracking monitor (6) continuously records the occurrences in the station. When a new vehicle arrives at the station, the kiosk (5) transmits the vehicle information and the time to the tracking monitor (6). When the vehicle approaches the charging unit (2) and starts charging, when its charge is completed and when it is disconnected, the charging unit (2) transmits all the data of the charging process (such as charging started, charging in progress, charging completed, charging start time, charging end time) to the tracking monitor (6). The tracking monitor (6) records every incoming vehicle and exiting vehicle continuously.

The tracking monitor (6) monitors the event and time. In event tracking, entry, exit, service start and end times of all vehicles are tracked. When a vehicle enters or exits the station, the event related to the vehicle is transmitted to the controller (7) and the control passes to the controller (7). With the event reported by the tracking monitor (6), the controller (7) takes action. If the vehicle has left the electric vehicle charging station (1), the controller (7) decides which vehicle class the empty charging unit (2) (server) will be assigned to, in other words, whether it will serve the high priority or low priority vehicle class. When a vehicle arrives at the electric vehicle charging station (1), the controller (7) decides where this vehicle will be directed, whether it will be directed to the waiting area (3) or to the charging unit.

The controller (7) preferably consists of decision maker (7.1) and system module (7.2) units. When the controller (7) works, initially the decision maker (7.1) takes action. Depending on the event that causes the controller (7) to work, the controller (7) makes decisions in different ways. The controller (7) is adapted to act differently to the electric vehicle charging station (1) depending on the vehicle arrival or vehicle departure situations.

If the event is a vehicle arrival and there is an empty server at the station, the controller (7) directs the vehicle to the said charging unit (2). If there are no empty charging units (2) at the electric vehicle charging station (1), the controller (7) directs the vehicle to the waiting area (3).

If the event is a vehicle leaving the station, it means that a charging unit (2) is then idle. When the charging unit (2) which completes the charging process, preferably notifies the tracking monitor (6) that the charging process is complete and the vehicle leaves the station. Then, the tracking monitor (6) informs the controller (7) that the charging unit (2) is empty. If there is only one class vehicle in the waiting area (3), the decision maker (7.1) directs the first vehicle of that priority class to the vacant charging unit (2) and transmits this information to the controller (7). If there are vehicles from both classes in the waiting area, the decision maker (7.1) connects to the system module (7.2) to determine which class the empty charging unit will be assigned to, and decides how the class via the system module (7.2).

The decision maker (7.1) sends two different scenarios to the system module (7.2). The first scenario is that the empty charger (2) is assigned to the high priority vehicle class. The second scenario is the scenario where the empty charger (2) is assigned to the low priority vehicle class. The system module (7.2) calculates the average waiting times for high priority (HP) vehicle and low priority (LP) vehicle classes, which will occur for both scenarios, and transmits them to the decision maker (7.1). The decision maker (7.1) calculates which scenario will bring the electric vehicle charging station (1) closer to the "waiting time rate" target announced by the electric vehicle charging station and directs the next vehicle of the class it has chosen to the charging unit (2).

The system module (7.2) includes the electric vehicle charging station's (1) discrete event simulation model and performs simulations according to the model in question. The decision maker (7.1) runs the system module (7.2) for different scenarios, estimating the effect of its decisions on the average waiting times of the high priority and low priority vehicles in the station and is adapted to make its decision using these estimation results. The system module (7.2) is adapted to receive the information about the current state of the station, the number of high/low priority vehicles in the station, the arrival moments of these vehicles at the station, the information on which ones start charging at what time, and the requested charging time information from the charging unit (2), the tracking monitor (6) and the controller (7), and to assign the server that becomes idle to different classes in this state of the station, and to calculate the average class waiting times and to transmit it to the decision maker (7.1).

The electric vehicle charging station (1), which is the subject of the application, is used with the system module (7.2), which is a simulation-based estimator. By using the decision maker (7.1) and the system module (7.2), the controller (7) aims to keep the ratio of the average waiting times of the low priority and high priority vehicles in the station in the same queue within the target waiting time rate announced by the station. Then, the controller (7) decides in which priority class the charging unit will serve, according to the data it receives from the decision maker (7.1) and the system module (7.2). The controller (7) transmits the plate number of the vehicle and the information on which charging unit (2) it should go to, via the tracking monitor (6), to the direction sign (4) in order to direct the vehicles.

At the electric vehicle charging station (1), which is the subject of the application, it is ensured that users can receive fast charging service with high or low priority, and that the devices of the charging units (2) located in the charging station (1) can be instantaneously dynamically planned as low priority and high priority, and that the service received is charged according to the said plan.

An application of the electric vehicle charging station (1), which is the subject of the application, is as follows: Vehicles arriving at electric vehicle charging stations (1) for priority service are divided into two classes as high and low priority vehicles. High priority vehicles are those that are willing to pay more for a shorter wait. Low priority vehicles accept to wait longer to take advantage of lower prices. At the electric vehicle charging station (1), the ratio of the waiting times of high and low priority vehicles in the same time slot at the station is kept at a target rate that the station will announce in advance. The station announces a "target wait rate (twr)" to its customers. The target wait rate is the ratio of the average waiting times (LPW) of the low priority vehicles and the average waiting times (HPW) of the high priority vehicles (twr=LPW/HPW) that are at the station at the same time. For example, if twr=1.5 and LPW=15 minutes, it is desired to have HPW=10 minutes. The target waiting time rate given for the vehicles at the electric vehicle charging station (1) ensures keeping the ratio of HPW and LPW at the target waiting time rate announced by the station. The necessary decisions for this are made by the controller (7) according to the data received by the controller (7) from the decision maker (7.1) and the system module (7.2). The tracking monitor (6) constantly monitors the station, and each incoming and outgoing vehicle is reported to the monitoring monitor (6) by the charger unit (2). When there is an event such as vehicle entry and exit at the station, the tracking monitor (6) reports this situation to the controller (7). When the controller (7) works, the decision maker (7.1) starts to work. The decision maker (7.1) sends two different scenarios to the system module (7.2). The first scenario is that the empty charger (2) is assigned to the high priority vehicle class. The second scenario is the scenario where the empty charger (2) is assigned to the low priority vehicle class. The system module (7.2) calculates the average waiting times for high priority (HP) vehicle and low priority (LP) vehicles, which will occur under both scenarios, and transmits them to the decision maker (7.1). The decision maker (7.1) calculates which scenario will bring the ratio of the average waiting times closer to the "target waiting rate" announced by the electric vehicle charging station (1) and transmits it to the controller (7). The controller (7) directs the first vehicle of the class it has chosen to the charging unit (2) via the monitor (6) and the direction sign (4).

The invention claimed is:

1. An electric vehicle charging station enabling users to receive fast service with high or low priority, and keeping the ratio of average waiting times of low priority and high priority vehicles in the station at the same time at the target waiting time rate declared by the station, using a simulation based estimator based on the station occupancy rate and state, the charging station comprising:
    at least one charging unit enabling the charging of electric vehicles and keeping track of the charged vehicle information, the charging time, and the charging duration length recording,
    a waiting area at the station having sections where vehicles can wait and having a guidance signboard,
    at least one kiosk, located at the station entrance, with a screen, wireless data communication unit and processor on which the user can interact with his smart device, and adapted to receive the user's high priority or low priority service request by recognizing or communication with the user, a tracking monitor adapted to communicate with the charging unit, guidance signboard, and kiosk in a wired or wireless fashion, to track the events and time, track the entry, exit, service start and end times of all vehicles according to the data received from the charging unit, to track the event related to the vehicle when a vehicle enters or exits the station, and transmit thereof to the controller;
    a controller comprising a decision maker and a system module, and adapted to take action with the event reported by the tracking monitor, to decide whether the charging unit which becomes idle when the vehicle leaves the station would be assigned a high priority or low priority vehicle class, and to decide where to direct the incoming vehicle when a new vehicle arrives at the station,
    the decision maker adapted to take action first when the controller works, to act differently depending on the vehicle arrival or departure event that caused the controller to operate,
    in case the event is a vehicle arrival and there is an idle charging unit at the station, to direct the vehicle to the charging unit, and if there is no idle charging unit, to direct the vehicle to the waiting area,
    in case the event that occurs is a vehicle leaving the station, and if there is only one class vehicle in the waiting area, to direct the first vehicle of that class to the idle charging unit, and in case there are vehicles of both classes in the waiting area, to determine which class the idle charging unit will be assigned to,
    the system module adapted to estimate the effect of the decisions made by the decision maker on the average waiting times of the high priority and low priority vehicles in the station by being run by the decision maker for different scenarios, and to enable the decision maker to make their decisions based on the said prediction results.

2. The electric vehicle charging station according to claim 1, wherein the controller comprises of the decision maker and the system module unit, and when it works, adapted to activate the decision maker to make decisions in different ways according to the event that causes it to work, and to act differently to the electric vehicle charging station according to vehicle arrival or vehicle departure situations.

3. The electric vehicle charging station according to claim 1, wherein the decision maker is adapted, if there are vehicles from both classes in the waiting area, to determine which class the empty charging unit will be assigned to, and to decide according to the high priority and low priority average waiting times received from the system module by connecting to the system module.

4. The electric vehicle charging station according to claim 1, wherein the system module is adapted to calculate the average high priority vehicle and low priority vehicle waiting times according to the scenarios where the charger that became idle is assigned to the high priority vehicle class and the scenario where the charger that became idle is assigned to the low priority vehicle class, and transmit them to the decision maker.

5. The electric vehicle charging station according to claim 1, wherein the decision maker is adapted to calculate which scenario will bring the electric vehicle charging station (1) closer to the "waiting time rate" target announced by the electric vehicle charging station and direct the next vehicle of the class it has chosen to the charging unit.

6. The electric vehicle charging station according to claim 1, wherein the system module comprises a discrete event simulation model and is adapted to make simulations according to the said model.

7. The electric vehicle charging station according to claim 1, wherein the decision maker is adapted to run the system module for different scenarios, estimating the effect of its decisions on the average waiting times of the high priority and low priority vehicles in the station and to make its decision using these estimation results.

8. The electric vehicle charging station according to claim 1, wherein the system module is adapted to receive the information about the current state of the station, the number of high/low priority vehicles in the station, the arrival times of these vehicles at the station, the information on which ones start charging at what time and the charging duration length they request, from the charging unit, the monitor and the controller, and to calculate the average class waiting times by assigning different classes to the idle charging unit in this state of the station and transmit thereof to the decision maker.

9. The electric vehicle charging station according to claim 1, wherein the charging unit, the guidance signboard, the kiosk and the tracking monitor, which have a receiver and a transmitter that can communicate in a wired and wireless fashion, are able to communicate with each other, and are able to transmit and receive data to/from each other.

10. The electric vehicle charging station according to claim 1, wherein the guidance signboard is located in the waiting area, comprising display, processor, memory card, cable/wireless transceiver, and speaker equipment, providing information via the screen thereon, and adapted to show which vehicle will go to which charging unit, which charging unit is planned for which vehicle, and to make voice announcements.

* * * * *